Patented Oct. 31, 1950

2,527,643

UNITED STATES PATENT OFFICE 2,527,643

COATING AND SIZING COMPOSITION

Charles R. W. Morison, Glenshaw, Pa., assignor, by mesne assignments to Union Carbide and Carbon Corporation, a corporation of New York No Drawing. Application October 28, 1947, Serial No. 782,689

7 Claims. (Cl. 106—154)

This invention relates to the production of sizing and coating compositions having a basis of a water-soluble cellulose ether that provide films and coatings which are tough, flexible and strongly adherent to surfaces of a variety of materials such as filaments, yarns, sheets, films, tubing and other articles of glass, cellulose derivatives such as cellulose acetates and viscose rayons, nylon, resinous copolymers of vinyl chloride with vinyl acetate or with acrylonitrile, and other materials. The new compositions are especially adapted for use as a warp size in connection with the weaving of fabrics from yarns of glass, nylon, cellulose acetate, viscose rayons and the like.

Warp sizes are commonly used in connection with the weaving of such yarns in order to help maintain the original tenacity of the yarn by reducing the abrasion during weaving, as well as to lay the loose filaments of the yarn. Aqueous solutions of gelatine and starch have been used as warp sizes. Glycerin, and certain natural gums, waxes and fatty acids also have been suggested for such use.

Among the more important objects of the invention are the following: to provide a novel coating and sizing composition comprising a water-soluble cellulose ether and which is strongly adherent to surfaces of glass, nylon and cellulose derivatives; to provide such a composition which readily is removable from such surfaces by washing with water; to provide a composition comprising a water-soluble cellulose ether and a soy bean glue, and which provides a film or coating that, when dry, is free from brittleness; and the composition may, if desired, contain a lubricant. These and other objects will be apparent from the following description.

The coating and sizing composition of the invention comprises a water-soluble cellulose ether and a soy bean glue, with or without a water-soluble plasticizer for the cellulose ether which is compatible with the latter and with the glue. The soy bean glue may be present in an amount ranging between 0.1 part and 0.8 part by dry weight for each part by weight of the dry cellulose ether. The larger amounts of the soy bean glue (0.4 or more glue per part of the ether) are preferred in compositions intended for sizing nylon. However, the weight ratio of the soy bean glue to the cellulose ether generally is maintained no higher than 0.4:1, particularly when the composition is intended for sizing glass yarn or cellulose acetate yarns, and if the composition also contains a plasticizer such as glycerin to prevent brittleness of the resultant film at low humidities.

The preferred compositions contain between around 1% and around 14% of total solids, including plasticizer.

Among the water-soluble cellulose ethers especially useful in the process are the water-soluble methyl celluloses and ethyl celluloses, the water-soluble hydroxyalkyl ethers of cellulose such as the hydroxyethyl celluloses, and sodium carboxymethyl cellulose.

The soy bean glues useful with the invention commonly are produced by mixing soy bean flour or soy bean protein with water and one or more alkaline alkali metal compounds such as caustic soda, sodium carbonate, potassium silicate or sodium phosphate, together with an alkaline alkaline earth metal compound such as calcium oxide or hydroxide, calcium carbonate or calcium phosphate. Other compounds may be present, such as an alkali metal fluoride or chloride, a preserving agent such as copper sulfate, and a hardening agent such as formalin. The resultant suspension then is dried, commonly at temperatures around 50° C., and the resultant soy bean glue is powdered for use.

The following examples (a) to (c) illustrate soy bean glues found useful in the process (all parts being by weight unless otherwise specified):

(a) A glue was made by mixing 100 parts of soy bean protein with 1,000 parts of water with agitation, and adding 5 parts of sodium hydroxide and 10 parts of calcium hydroxide. The suspension was dried at 50° C., and the dried soy bean glue was powdered.

(b) A glue of the following formula:

| | Parts |
|---|---|
| Soy bean protein | 10 |
| Calcium hydroxide | 2 |
| Sodium hydroxide | 0.5 |
| Sodium fluoride | 0.5 |
| Water | 50 |

If desired from 0.1 to 1.0 part of a phosphatide may be added.

This mixture may be dried as in Example (a).

(c) A soy bean glue of the formula:

| | Parts |
|---|---|
| Soy bean protein | 10 |
| Sodium silicate | 2.5 |
| Sodium hydroxide | 0.5 |
| Calcium hydroxide | 1.0 |
| Formalin | 1.5 |
| Water | 24.3 |

The glue then may be dried and pulverized.

Although soy bean glues prepared from mixtures containing no alkaline alkaline earth metal compounds may be used in the process, those glues containing such compounds, and particularly calcium compounds, are preferred and give outstanding results in improving the bond of the coating and sizing composition to the surface of yarns and other articles of glass, nylon, cellulose acetate, and vinyl chloride-vinyl acetate copolymers. Thus, films one mil in thickness made from water-soluble cellulose ethers and the soy bean glues containing an alkaline earth metal hydroxide, oxide or the like cannot be removed from a 6 inch square of the surface being used as a base in a single piece, due to the strong adhesive action, whereas similar films in which the soy bean glue component contains an alkali metal compound such as caustic soda in place of the alkaline earth metal compound can be removed from the base in a single piece, although the resistance to removal is somewhat greater than in the case of films containing no soy bean glue. A size is said to adhere well when a dry film thereof can be scraped from the base only in the form of fine pieces, even though the size has adequate tensile strength. A size is said to adhere poorly to a surface when a dry film thereof readily can be lifted off such surface intact.

The effectiveness of the soy bean protein glues in the composition is surprising since water-soluble cellulose ether compositions containing such other adhesives as casein glues, starch esters, chlorinated starches, polyvinyl alcohols, hide glues, alginates, soluble starches, acrylic esters, gum arabic, and gelatin base glues do not improve the adhesion of the cellulose ether to glass, cellulose acetate products and the like. Water-soluble cellulose ethers such as hydroxyethyl cellulose do not adhere to glass or cellulose acetate satisfactorily when in the pure state, and films of the cellulose ether readily may be pulled away intact from the surface of glass or cellulose acetate coated therewith.

Among suitable water-soluble plasticizers which may be substituted for glycerin in the composition and which are compatible with the cellulose ether in amounts up to at least 1.6 parts per part of the latter may be mentioned other polyhydric alcohols, including the mono- and polyglycols— e. g., ethylene glycol, propylene glycol, diethylene glycol, triethylene glycol, and the polyoxypropylene glycols having average molecular weights around 300.

It sometimes is advantageous to have present in a warp sizing composition a small amount of a compound functioning as a lubricant, which is uniformly distributed within the composition and which remains in the deposited sizing film when first formed. Among lubricants useful when present in amounts between around 0.05 and 0.4 part, but preferably not over 0.2 part, for each part of the cellulose ether, are the esters of fatty acids having from 10 to 18 carbon atoms with the alkanols and alkoxyalkanols having at least 4 carbon atoms in the alkyl or alkoxy alkyl group, such as 2-butoxyethyl stearate, ethoxyethyl stearate, butoxyethoxyethyl stearate, 2-butoxyethyl laurate, butyl laurate, butyl palmitate and butyl stearate, and the like. The composition containing these small amounts of lubricants retains its adhesive properties in satisfactory degree. The laurates, palmitates and stearates of aliphatic monohydric alcohols and alcohol ethers are preferred when a lubricant is desired.

Repeated but generally unsuccessful efforts have been made in the past to utilize soy bean derivatives per se as sizes for various types of continuous filament yarns such as those made of glass, viscose rayon, cellulose acetate, nylon and vinyl chloride-vinyl acetate copolymer resins. Other efforts to utilize as sizes for continuous filament yarns water-soluble cellulose ethers such as methyl cellulose and hydroxyethyl cellulose have been unsuccessful because of the poor adhesion of these materials to such yarns.

The compositions of this invention, on the other hand, when dried, adhere strongly to the surfaces of yarns or other articles made of glass, nylon, and cellulose derivatives such as cellulose acetate and viscose cellulose, without in any manner injuring such articles; and the films thus deposited upon the articles readily are removable by washing in water or in aqueous solutions containing a detergent such as a water-soluble soap.

When the sized and dry articles are exposed to the atmosphere at relative humidities under about 40%–50%, the presence of a plasticizer prevents any embrittlement and any tendency for the film to break away from the base upon being folded or roughly handled. The plasticizer softens the film and, in the amounts indicated, actually improves the adhesion of the film. When the sized articles are to be woven or processed at relative humidities above 40%–50%, generally no plasticizer is needed.

The following examples serve to illustrate the invention. In the examples all parts are given in terms of weight unless otherwise indicated.

*Example I*

A composition was prepared by mixing an approximately 10% aqueous solution of a water-soluble hydroxyethyl cellulose (a 5% aqueous solution of which has a viscosity of 101 centipoises at 20° C.), with 40% of a dry soy bean glue of the general type described in Example (b), based on the dry weight of the cellulose ether. The composition was cast upon a sheet of cellulose acetate and dried at 90° C. The resultant film was clear and adhered strongly to the sheet of cellulose acetate.

*Example II*

A composition adapted for sizing glass yarn of any degree of fineness—particularly those of around one denier or less per filament—was prepared by mixing 1,000 parts of a 10% aqueous solution of an hydroxyethyl cellulose (a 5% solution of which at 20° C. has a viscosity of 21.8 centipoises) with 30 parts of soy bean glue and 10 parts of glycerin.

The soy bean glue was prepared by mixing 100 parts of soy bean protein with 1,000 parts of water, adding 10 parts of calcium hydroxide and 5 parts of sodium hydroxide. The resultant product was dried at 50° C., and the residue was powdered and formed the soy bean glue. The undried glue may be added to the solution of the cellulose ether, in which case 300 parts of the glue are used in the composition in place of 30 grams thereof.

The resultant sizing composition is diluted with water as desired. Generally a sizing solution containing about 5% of total solids based upon the cellulose ether, glue and, when present, the plasticizer and lubricant, is preferred for most purposes. The total solids content commonly lies within the range between 1% and 14% of the composition, while the preferred total solids range lies between about 4% and 10%.

The aforesaid composition is especially useful under conditions where the sized articles are processed in an atmosphere having a relative humidity around 35%–50%. At higher humidities the amount of glycerin is decreased, or it is eliminated. At lower humidities it is increased.

A second composition was prepared that was similar to the composition of this example excepting that about one part of butoxyethyl stearate was added to act as a lubricant. This composition provided a size coating that, when dried, adhered well to articles of glass and to cellulose acetate, and formed an adherent film on glass yarns from which, when subjected to pressure, the lubricant sweated out sufficiently to lubricate the yarn.

Each of the sizing compositions of Example II may be applied to glass yarn in a standard type of 7-can slasher in the same manner that gelatin or starch sizes are applied. The temperature of the size bath preferably is about 130° to 200° F. The drying cans may be held at 175° to 250° F., depending upon their speed of rotation.

Cellulose acetate yarn is sized in a similar manner and under similar conditions, excepting that the temperature in the drying cans should not exceed 200° F. The yarn thus sized has a continuous film type of coating which adheres strongly to the yarn and greatly increases the loom efficiency in weaving. The size readily is removable after the cloth is woven by washing gently in cold or hot water.

Example III

Six parts of the dry soy bean glue corresponding to the Formula (b) was mixed with 150.4 parts of water at 130° F. To this mixture were added with intimate mixing 9.6 parts of dry powdered water-soluble hydroxyethyl cellulose (a 5% aqueous solution of which had a viscosity at 20° C. of around 20 centipoises), and 2 parts of glycerin, all parts by weight. This sizing solution, which had a total solids content of 10.4%, was applied to nylon yarn in a commercial Johnson 7-can slasher sizing machine. The temperature of the size bath was 140° F. The temperature in the first can was 180° F. and that in the next five cans was 220° C. The take-up speed of the yarn was 15 yards per minute. The adhesion of the size to the nylon when dry was quite satisfactory.

Example IV

To 100 parts of a 10% aqueous solution of a water-soluble hydroxyethyl cellulose (a 5% solution of which had a viscosity at 20° C. of 15.5 centipoises) were added 4 parts of dry soy bean glue similar to that of Example (b) and intimately mixed. The resultant solution was cast as films upon cellulose acetate sheets that had been cast on glass and dried at 90° C. After the films stood for several days at room temperature the sheets of cellulose acetate bearing the films were exposed for 48 hours to air at various humidities. They were then examined to determine the tenacity with which the sizing composition adhered to the cellulose acetate sheets. At humidities of 50% and above, the film of the sizing composition could be removed only by being scraped off as a crumpled mass, indicating good adhesion. Even at relative humidities as low as 15%, fair adhesion was secured.

Example V

This example illustrates the improvement in the adhesion and softness of the films made from compositions of the invention by the introduction of a plasticizer into the composition.

To 50-part portions of the aqueous solution of hydroxyethyl cellulose described in Example IV, to each portion of which have been added 2 parts of the dry soy bean glue of that example, were added various amounts of glycerin, ranging in amount from 20% to 160%, based upon the dry weight of the cellulose ether.

The resultant solutions were cast on cellulose acetate films and allowed to condition for two days at room temperature and a relative humidity of 45%. All of the films adhered well to the cellulose acetate base. Those containing between around 0.8 part and 1.3 parts of glycerin for each part of the dry cellulose ether were soft and pliable. Those having less than 0.6 part of glycerin per part of the cellulose ether tended to be somewhat brittle.

Example VI

Fifty parts of a 10% aqueous solution of a low viscosity hydroxyethyl cellulose (a 5% solution of which has a viscosity at 20° C. of 20 centipoises), 2 parts of dry soy bean glue of the general type described in Example (b), 2 parts of glycerin and 1 part of butoxyethyl stearate were intimately mixed in the above order, and the composition was cast as a film on a glass plate. After being dried at 90° C. the film adhered strongly to the glass, was pliable, had good strength, and, upon being rubbed under pressure with a blunt tool yielded sufficient of the stearate at the surface of the film to function as a lubricant.

Example VII

Five parts of a soy bean glue were mixed with 50 parts of 10% aqueous solution of a water-soluble hydroxyethyl cellulose (a 5% solution of which has a viscosity at 20° C. of 20 centipoises). The resultant composition was cast on glass to form a film that, upon drying at 90° C., adhered strongly to the glass.

The soy bean glue was prepared by mixing the following ingredients in the order given:

| | Parts |
|---|---|
| Soy bean protein | 10 |
| Calcium oxide | 1.5 |
| Water | 50.0 |
| Sodium silicate | 0.7 | drying the glue to 90° C. and converting it to a powder.

Example VIII

Five parts of water-soluble methyl cellulose (a 2% aqueous solution of which has a specific viscosity at 20° C. of 15 centipoises) were dissolved in 50 parts of water, and 1 part of a soy bean glue of the type described in Example (b) was mixed with the solution. Films of this composition were cast on glass and dried at 90° C. The films adhered strongly to the glass.

Similar results were secured when the methyl cellulose was replaced in this formula by an equal weight of sodium carboxymethyl cellulose (a 2% aqueous solution of which at 20° C. has a specific viscosity of 20–70 centipoises).

As previously indicated, compositions containing as little as 0.04 part by weight of the soy bean glue for each part of the dry cellulose ether are homogeneous, and thin films thereof have good adhesion to the surfaces of glass, nylon, cellulose acetate and the like after drying at temperatures around 90° C.–95° C. or lower. Amounts of the glue greater than about 0.2 part thereof by weight per part of the cellulose ether tend to impart brittleness to dried films or coatings of the composition. Therefore, compositions having higher proportions of glue to cellulose ether preferably have present a plasticizer to eliminate or minimize brittleness.

The term "soy bean glue" and similar expressions used in the claims are intended to designate those glues made by mixing soy bean meal or soy bean protein with an alkaline alkali metal compound together with an alkaline alkaline earth metal compound, such as the oxides, hydroxides and phosphates of calcium, barium and strontium.

I claim:

1. A coating and sizing composition for filaments, yarns, films, sheets and tubing made from glass, cellulose derivatives, nylon and the like, which comprises a water-soluble cellulose ether and a soy bean glue in the proportions, on the dry basis, of between 0.1 part and 0.8 part by weight of the soy bean glue to each part by weight of the cellulose ether.

2. A coating and sizing composition for filaments, yarns, films, sheets and tubing made from glass, cellulose derivatives, nylon and the like, which comprises an aqueous solution of a water-soluble cellulose ether, a soy bean glue and a water-soluble plasticizer for said ether and glue selected from the class consisting of glycerol and the mono- and polyglycols, in the respective proportions by weight of between 0.1 part and 0.8 part of dry soy bean glue and between 0.1 part and 1.6 parts of the plasticizer for each part of the dry cellulose ether.

3. A coating and sizing composition for filaments, yarns, films, sheets and tubing made from glass, cellulose derivatives, nylon and the like, which comprises an aqueous solution of a water-soluble cellulose ether, a soy bean glue, and a water-soluble polyhydric alcohol in the respective proportions by weight of between 0.1 part and 0.8 part of the dry soy bean glue and between 0.1 part and 1.6 parts of the polyhydric alcohol for each part of the dry cellulose ether.

4. A coating and sizing composition for filaments, yarns, films, sheets and tubing made from glass, cellulose derivatives, nylon and the like, which comprises an aqueous solution of a water-soluble cellulose ether, a soy bean glue, a water-soluble plasticizer for said ether and said glue, and a lubricant selected from the class consisting of the esters of fatty acids having from 10 to 18 carbon atoms with the alkanols having at least 4 carbon atoms in the alkyl group and esters of the said fatty acids with the alkoxyalkanols having at least 4 carbon atoms in the alkoxyalkyl group, in the respective proportions by weight of between 0.1 part and 0.8 part of the dry soy bean glue, between 0.1 part and 1.6 parts of the plasticizer, and between 0.05 and 0.2 part of the lubricant for each part of the dry cellulose ether.

5. A composition suitable for sizing filaments and yarns of glass, organic derivatives of cellulose, nylon and the like, and which is strongly adherent thereto, which comprises an aqueous solution of a water-soluble cellulose ether and from 10% to 80% on the dry basis of a soy bean glue based upon the weight of the dry cellulose ether, said aqueous composition containing between 1% and 14% of total solids derived from the cellulose ether and glue, and being readily removable from a yarn by treatment with water.

6. A coating and sizing composition for filaments and yarns of glass, organic derivatives of cellulose, nylon and the like, and which is strongly adherent thereto, which comprises an aqueous solution of a water-soluble cellulose ether containing between 10% and 80% of a dry soy bean glue and between 10% and 160% of a polyhydric alcohol, respectively based on the weight of the dry cellulose ether, said composition containing between 1% and 14% of total solids derived from the cellulose ether, glue and alcohol, and being readily removable from a yarn by treatment with water.

7. A coating and sizing composition for filaments and yarns of glass, organic derivatives of cellulose, nylon and the like, and which is strongly adherent thereto, which comprises an aqueous solution of a water-soluble cellulose ether containing between 10% and 80% of a dry soy bean glue, between 10% and 160% of a polyhydric alcohol, and between 5% and 20% of a fatty acid ester, respectively, based upon the dry weight of the cellulose ether, said composition containing between 1% and 14% of total solids derived from cellulose ether, glue, polyhydric alcohol and fatty acid ester, and being readily removable from a yarn by treatment with hot or cold water, the said fatty acid ester being selected from the class consisting of the esters of fatty acids having from 10 to 18 carbon atoms with the alkanols having at least 4 carbon atoms in the alkyl group and the esters of the said fatty acids with the alkoxyalkanols having at least 4 carbon atoms in the alkoxyalkyl group.

CHARLES R. W. MORISON.

REFERENCES CITED

The following references are of record in the file of this patent:

UNITED STATES PATENTS

| Number | Name | Date |
|---|---|---|
| 1,245,975 | Satow | Nov. 6, 1917 |
| 1,622,496 | Davidson et al. | Mar. 29, 1927 |
| 1,726,510 | Cone et al. | Aug. 27, 1929 |
| 2,174,438 | Corwin et al. | Sept. 26, 1939 |
| 2,312,469 | Freund | Mar. 2, 1943 |

OTHER REFERENCES

Hercules CMC, a publication of Hercules Powder Co., May 1946, pp. 3–4.